United States Patent [19]

Schilling

[11] 4,141,838
[45] Feb. 27, 1979

[54] DIALYSIS MEMBRANE, ESPECIALLY FOR HEMODIALYSIS, AND METHOD FOR PRODUCING SAME

[76] Inventor: Berthold Schilling, Kirchstrasse 15, 5439 Elsoff, Fed. Rep. of Germany

[21] Appl. No.: 754,998

[22] Filed: Dec. 28, 1976

[30] Foreign Application Priority Data

Dec. 31, 1975 [DE]  Fed. Rep. of Germany ....... 2559332

[51] Int. Cl.$^2$ ...................... B01D 39/10; B01D 39/20; C25D 5/00; B05D 1/40
[52] U.S. Cl. ................................ 210/498; 210/500 M; 210/506; 210/507; 210/509; 427/251; 204/38 S
[58] Field of Search .............. 210/500 M, 509, 500 R, 210/506, 510, 498, 507; 29/163.5 F; 427/245, 247, 34, 241, 251, 252; 204/11, 24, 38 S

[56] References Cited

U.S. PATENT DOCUMENTS

| 2,164,142 | 6/1939 | Moore | 210/510 |
| 2,409,295 | 10/1946 | Marvin et al. | 427/247 |
| 3,303,085 | 2/1967 | Price et al. | 210/498 |
| 3,352,769 | 11/1967 | Ruben | 210/498 |
| 3,482,703 | 12/1969 | Roberts et al. | 210/506 |
| 3,502,499 | 3/1970 | Coad | 427/241 |
| 3,594,134 | 7/1971 | Russell et al. | 210/510 |

FOREIGN PATENT DOCUMENTS 7341275  6/1975  France ..................................... 210/506

Primary Examiner—Charles N. Hart
Assistant Examiner—David R. Sadowski
Attorney, Agent, or Firm—Staas & Halsey

[57] ABSTRACT

A dialysis membrane for hemodialysis having passages of uniform diameter and positioned uniform distances from each other.

9 Claims, 1 Drawing Figure

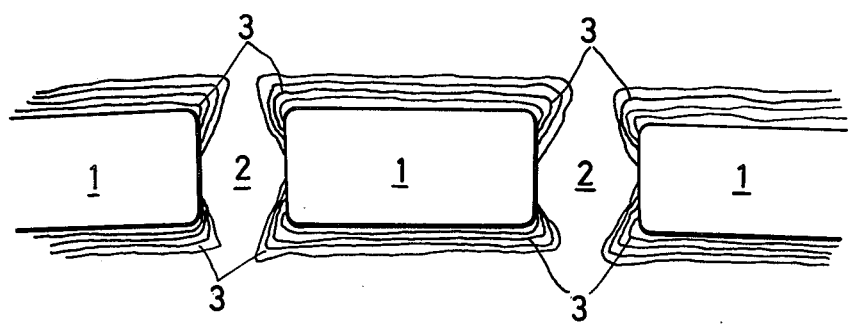

DIALYSIS MEMBRANE, ESPECIALLY FOR HEMODIALYSIS, AND METHOD FOR PRODUCING SAME

The invention relates to a dialysis membrane, especially for the hemodialysis and to a process for its production.

Such membranes are used for the separation of isotopes, for the desalination of sea water, for the purification of drinking water, for the dialysis for medicinal purposes etc.

The dialysis represents a selective diffusion of dissolved particles by semipermeable membranes. In medicine, the size of a hole for the passage of so-called crystalloides (f. ex. electrolytes, glucose, urea, creatine, barbiturates) must be sufficient, while colloides and corpuscular components (protein, fats, blood cells, bacteria and viruses) are not to pass (Pschyrembel, Clinical Dictionary, Walter de Gruyter & Co, Berlin 1969).

In medicine this is accomplished by means of an artificial kidney (hemodialysis) in which the blood and the fluid that is to be purified are separated from one another by a membrane. By diffusion, osmosis and ultrafiltration, an exchange of the components of those parts of the fluid takes place, which can pass through the passages of the separating membrane. The type and number of the parts which participate in an exchange therefore depend on the nature of the membrane, concerning the size of its holes and the distance between the holes.

The known membranes used in the hemodialysis are semisynthetic cellophane or cuprophane membranes.

By watering the cellophane which in its dry state is without pores, the latter swells up. Hollow spaces develop which adjoin each other as a result of which passages develop in the cellophane foil, which are of a size between 20 Å and 80 Å (Streicher, Hemodialysis, C. Bindernagel, publisher, Friedberg, 1973).

Since the existence of passages and their effective diameter cannot be predetermined, it is not possible to use a dialyser suitable for a sickness therapy. A chronic uremia, an acute failure of the kidneys, intoxications from medicaments and similar diseases are caused by bacteria, viruses, poisonous substances of variable molecular size. The as yet unknown poisons of uremia belong f. ex. to the medium molecules which have a molecular weight of about 20,000 and which can be removed only by a long duration of dialysis.

Also ruptures of the membrane are not completely to be excluded and represent a danger for the life of the patient (home dialysis).

Membranes with a definite diameter of their holes are known. These membranes consisting of nylon hollow fibers with a hole diameter of 20 Å, are used primarily in the processing of water. Hollow fibers or foils with a hole diameter of 80 Å are also offered for hemodialysis and, as has already been mentioned further above, cellophane membranes have the disadvantage that they can be used only one single time.

It is therefore the task of the invention to develop a dialysis membrane in such a way, that it will surely (with certainty) hold back substances of a certain diameter and will guarantee a uniform, quick passage of substances of a smaller size. Furthermore, this membrane should be reusable after use (f. ex. in the hemodialysis).

According to the invention, this task has been solved through the fact that the dialysis membrane has passages of a uniform diameter and of uniform distances from one another.

These diameters are to lie in the order of magnitude of a few Å, whenever the dialysis membrane has a thickness of about 12 to 13 $\mu$.

The dialysis membrane consists advantageously of a plate or of a foil which is provided with a coating. At the same time, the plate or foil has holes which run approximately perpendicularly in relation to the plane of the dialysis membrane.

The existence of passages which run approximately perpendicularly to the plane of the membrane and contrary to the winding channels of passage of the customary membranes (sponge structure), will permit one to reduce the duration of the hemodialysis essentially from about 10 hours, whereby this time is not conditional on the apparatus.

The dialysis membranes of the present invention can be sterilized after use and then reused at will.

Preferably the plate or foil consists of metal, a semiconductor or a dielectric and, in a special embodiment, of stainless steel. A membrane may also consist of a fine web (f. ex. a steel web).

In order to narrow down the passages, the membrane is coated on one side or on both sides.

On the basis of the controlled production (perpendicular passages) and continuous narrowing of the passages (coating), always membranes adapted to the special area of application are used.

For medicinal purposes it is necessary that the coating consists of a sterilizable material.

Preferably gold, silver or platinum is used. An effect which can be achieved therewith, the decrease of the precipitation of blood protein on the membrane, will also be achieved by silicon, chromium, nickel, vanadium, titanium, glass etc.

The reusability of the membrane made possible by sterilization, causes a considerable reduction of the treatment costs. This is important especially for home dialysis.

On the basis of the predeterminable size and frequency of the passages, the dialysers can be reduced in size in such a way, that eventually portable, artificial kidneys can be produced.

The invention furthermore relates to a process for the production of the membranes according to the invention. The process has been characterized in that holes are drilled into the plate or foil which are controllable as to size by a coating. Instead of the perforated plate or foil, a steel web can also be used. In that case, the passages are produced preferably by laser beams, electron beams, etc.

In that case, the diameter depends on the task set and it lies in most cases in the $\mu$m area. The drilling by means of laser or electron beams represents some of the few possibilities of making passages of such smallness in a reproducible manner. The smallest diameters which are technically reproducible at the present time lie between 1000 and 7000 Å.

The plate or foil may also be produced in a thin layer. f. ex. by vaporizing on the foil plate in the vacuum or by electrolytic application on a support with a smooth surface; after that, passages are produced and subsequently the membrane is separated from its support.

This process permits the production of even thinner membranes than represented by the plates or foils used in the case of drilling.

In practice, this is accomplished in most cases by means of a thin film or phototechnique which is also used in other areas of application.

At the same time, the plate or foil coated by electrolysis and subsequent vaporizing on, is preferred. At the same time average hole diameters of about 50,000 Å are reduced by electrolytic coating, down to about 10,000 Å. After retarding the relatively quick electrolysis process, the desired diameter of the passage of from 20 to 80 Å will be achieved by slow vaporizing on.

The coating may also be applied either by vaporising on in the vacuum or galvanically.

As a result of that for one thing, a narrowing down of the passages of the membrane will be achieved, whereby diameters of a few Å will be achieved, and for another thing, a suitable coating in the case of the use of the membrane for medical dialysis purposes will prevent the precipitation of blood protein on the membrane.

A more uniform vaporizing-shut of the passages will be achieved whenever the foil carries out a tumbling movement during the coating.

As a result of the small coating speed during vaporizing on, the growing shut of the passages can be controlled and directed very precisely. At the same time, the vaporizing on causes a smoothing of the surface of the coating material. A further smoothing of the edges of passage and of the surface will be achieved by tempering of the dialysis membrane after coating, down to below the melting temperature.

On the basis of the drawing, an embodiment of the present invention will be explained in more detail.

The drawing illustrates a sectional cut through a dialysis membrane according to the invention.

In a plate or foil 1 of stainless steel with a thickness of about 12 to 13 $\mu$, holes 2 with a diameter of about 5 $\mu$ are drilled with the aid of a laser beam. After that, the hole 2 is reduced by coating to such an extent until it has the desired diameter of 20 to 80 Å. The layer 3 at the same time is applied in two working sections. First of all the diameter of the hole is reduced by electrolysis and subsequently by vaporizing on. The drawing is neither true to scale nor is the invention limited to one dialysis membrane as shown in cross section in the drawing.

By the controlled production of a membrane, it will be possible to use a membrane suitable for the treatment of the disease in the dialyzer of an artificial kidney. The term suitable in this case refers to the thickness of the membrane, the diameter of the hole and the distance between the holes and the coating material.

A complete set of such membranes should cover an area of molecular weight up to about 60,000. An optimum treatment of the patients will be achieved through the fact, that the physician in charge will have the membrane suited for the treatment out of a set of membranes of different passages, ready at hand and can insert it into an artificial kidney.

I claim:

1. A structure for use with hemodialysis apparatus and the like comprising:
   reusable membrane means for effecting a purification of body fluids by diffusion, osmosis and ultrafiltration including;
   a foil-plate,
   said foil-plate having a plurality of passages therethrough,
   said passages being holes of substantially uniform diameter and of substantially uniform distance from one another,
   said holes being approximately perpendicular to the plane of the foil-plate,
   coating means provided on said foil-plate to accurately define the effective diameters of said holes, and
   each of the original holes being of approximately 50,000 Å in diameter with said coating means reducing the original diameter of each hole by using electrolysis to reduce said diameter to approximately 10,000 Å and then further reducing said diameter to the range of 20 to 80 Å for each hole by using vaporization.

2. A structure as in claim 1, wherein said coating means includes a coating uniformly applied on at least one side of said foil-plate for the purpose of precisely narrowing down the perpendicular holes.

3. A dialysis membrane as in claim 2, wherein said foil-plate and said coating thereon both consist of sterilizable material.

4. A dialysis membrane as in claim 3, wherein said foil-plate is made of material from the group consisting of metal, semiconductor material, and dielectric material, and said coating is one of the noble metals.

5. A dialysis membrane as in claim 3, wherein said foil-plate is made of material from the group consisting of metal, semiconductor material, and dielectric material, and said coating is made of material from the group consisting of silicone, chromium, nickle, vanadium, titanium, or glass.

6. A process for the making of a dialysis membrane comprising the following steps:
   the drilling of uniformly sized and spaced holes of approximately 50,000 Å into a foil-plate,
   controlably applying a thin coating to said foil-plate by electrolysis to precisely and uniformly reduce the diameter of each of the holes to approximately 10,000 Å,
   and subsequently further precisely and uniformly reducing the diameter of each of the holes to 20 to 80 Å by slowly vaporizing additional coating material thereon.

7. A process as in claim 6, further including the use of a vacuum during the slow vaporizing step.

8. A process as in claim 7, further including the use of a tumbling movement during the coating.

9. A process as in claim 8, further including the step of tempering the membrane after the coating down to below the melting temperature.

* * * * *